United States Patent
Parker

(10) Patent No.: US 7,140,646 B2
(45) Date of Patent: Nov. 28, 2006

(54) SHIELD FOR WALL PENETRATION OF FLEXIBLE TUBING

(76) Inventor: Matthew K. Parker, 6865 Mimms Dr., Doraville, GA (US) 30340

( * ) Notice: Subject to any disclaimer, the term of this patent is extended or adjusted under 35 U.S.C. 154(b) by 0 days.

(21) Appl. No.: 10/816,652

(22) Filed: Apr. 2, 2004

(65) Prior Publication Data
US 2005/0218649 A1 Oct. 6, 2005

(51) Int. Cl.
*F16L 11/118* (2006.01)
(52) U.S. Cl. .................. 285/154.1; 285/24; 174/58
(58) Field of Classification Search .................. 285/24, 285/142.1, 152.1, 154.1; 439/534, 536; 174/58, 174/63; 220/3.3
See application file for complete search history.

(56) References Cited

U.S. PATENT DOCUMENTS

| | | | |
|---|---|---|---|
| 269,086 A * | 12/1882 | McLaughlin | 285/152.1 |
| 3,575,313 A * | 4/1971 | Trachtenberg et al. | 174/58 |
| 3,954,289 A * | 5/1976 | Martin, Sr. | 285/142.1 |
| 4,103,101 A * | 7/1978 | Maier | 285/154.1 |
| 4,321,726 A * | 3/1982 | Rogers et al. | 285/413 |
| 4,667,840 A * | 5/1987 | Lindsey | 220/3.2 |
| 5,454,197 A * | 10/1995 | Horrigan | 52/218 |
| 5,588,681 A * | 12/1996 | Parks | 285/46 |
| 5,717,164 A * | 2/1998 | Shetterly | 174/58 |
| 6,435,727 B1 * | 8/2002 | Fingler et al. | 439/536 |
| 6,729,586 B1 * | 5/2004 | Arguijo et al. | 220/3.3 |
| 6,756,541 B1 * | 6/2004 | Mollick et al. | 174/58 |

FOREIGN PATENT DOCUMENTS

JP    4355619    *  9/1992  .................. 174/68

* cited by examiner

*Primary Examiner*—David Bochna

(57) ABSTRACT

A shield designed to be installed in exterior frame walls of buildings for the penetration of flexible tubing, cabling, or wiring. Comprised of a round, rectangular or square sleeve attached to mounting plate(s) or angle(s). The mounting plates or angles have holes to allow for the attachment of the shield to the framing of an exterior frame wall. The mounting plates or angles are attached to the sleeve at an angle sufficient to prevent the kinking of flexible tubing, cabling, or wiring.

9 Claims, 4 Drawing Sheets

PERSPECTIVE

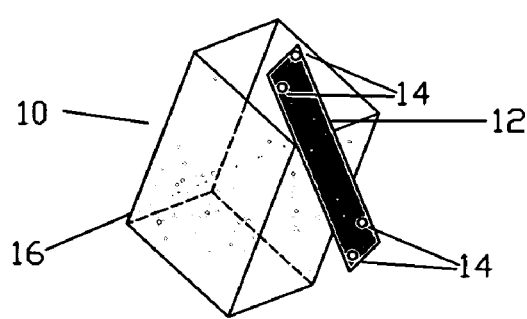
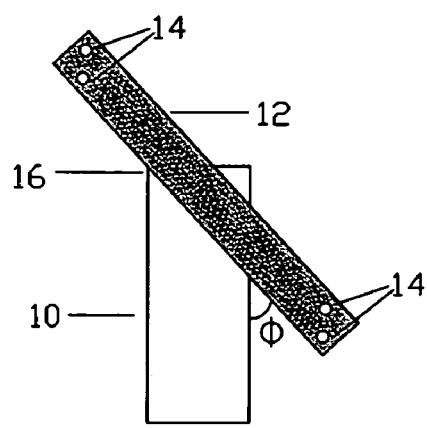
FIG 1A ISOMETRIC
FIG 1B SIDE
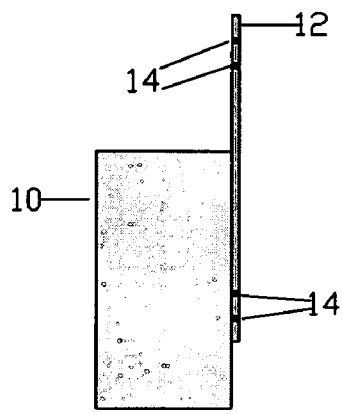
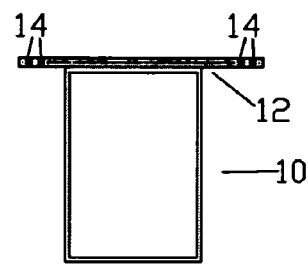
FIG 1C FRONT
FIG 1D TOP
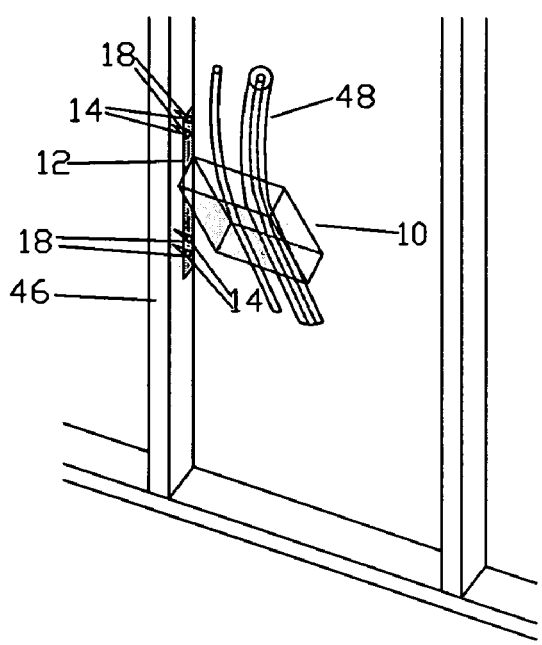
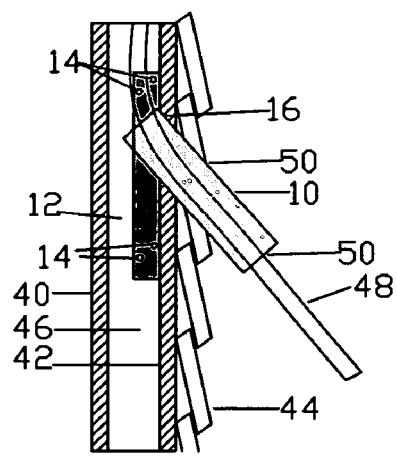
FIG 1E PERSPECTIVE
FIG 1F SIDE

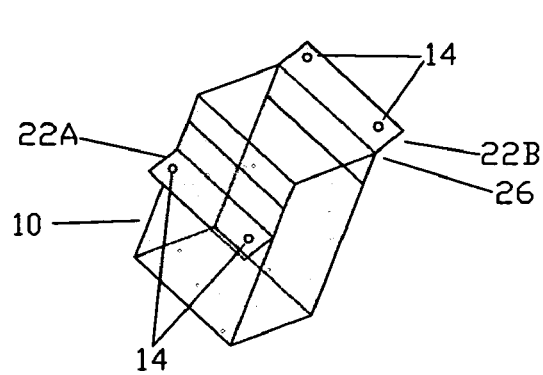
FIG 2A ISOMETRIC
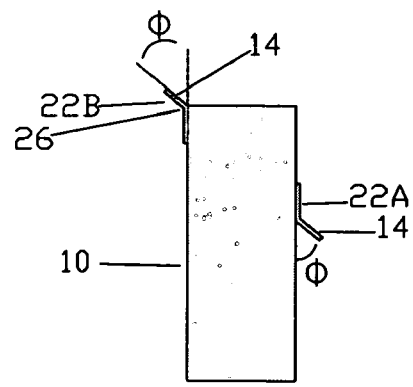
FIG 1B SIDE
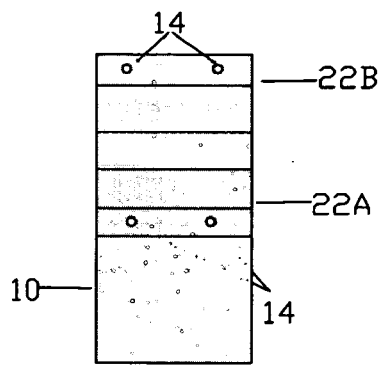
FIG 2C FRONT
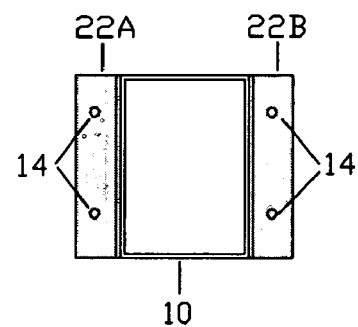
FIG 2D TOP
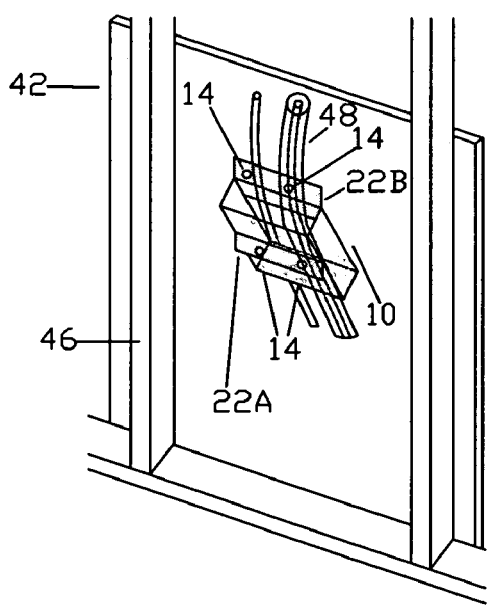
FIG 2E PERSPECTIVE
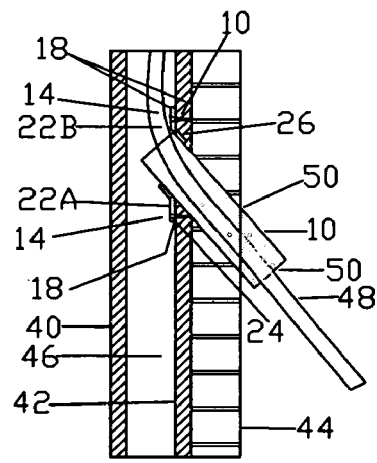
FIG 2F SIDE

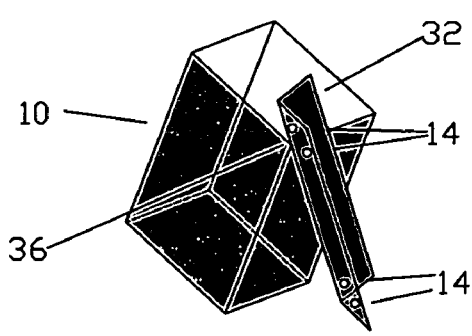
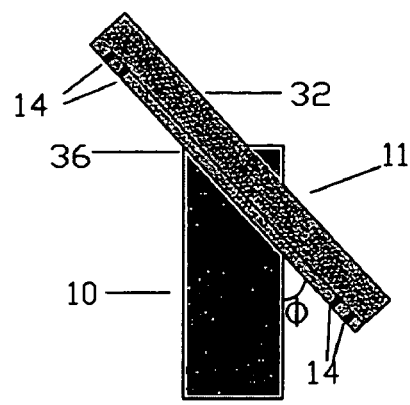
FIG 3A ISOMETRIC          FIG 3B SIDE
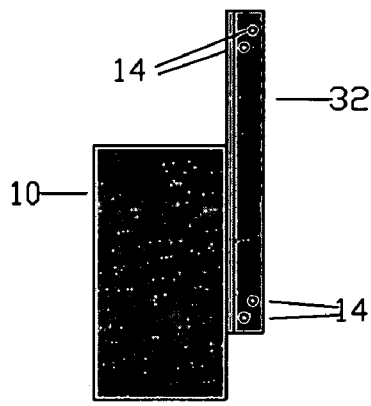
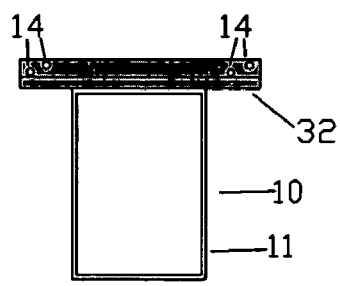
FIG 3C FRONT          FIG 3D TOP
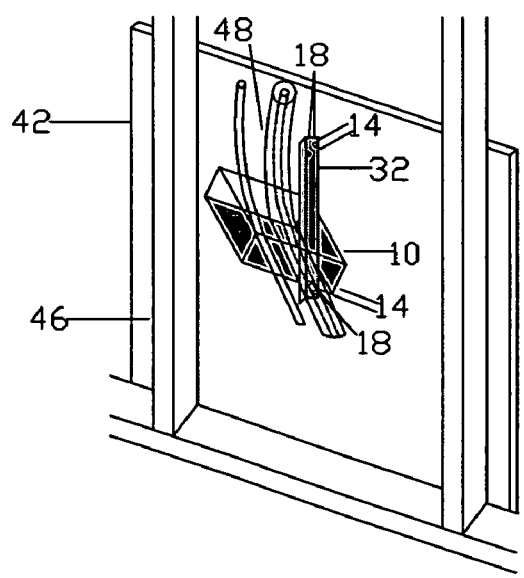
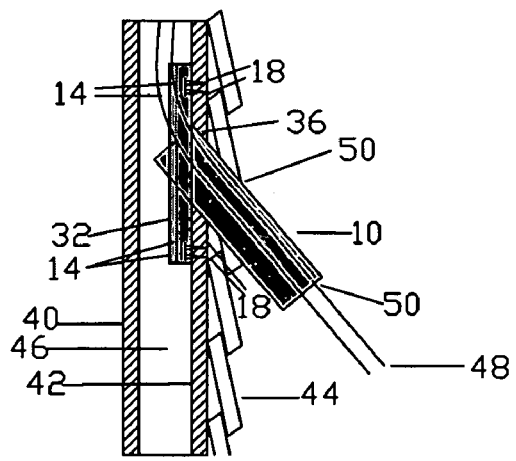
FIG 3E PERSPECTIVE          FIG 3F SIDE

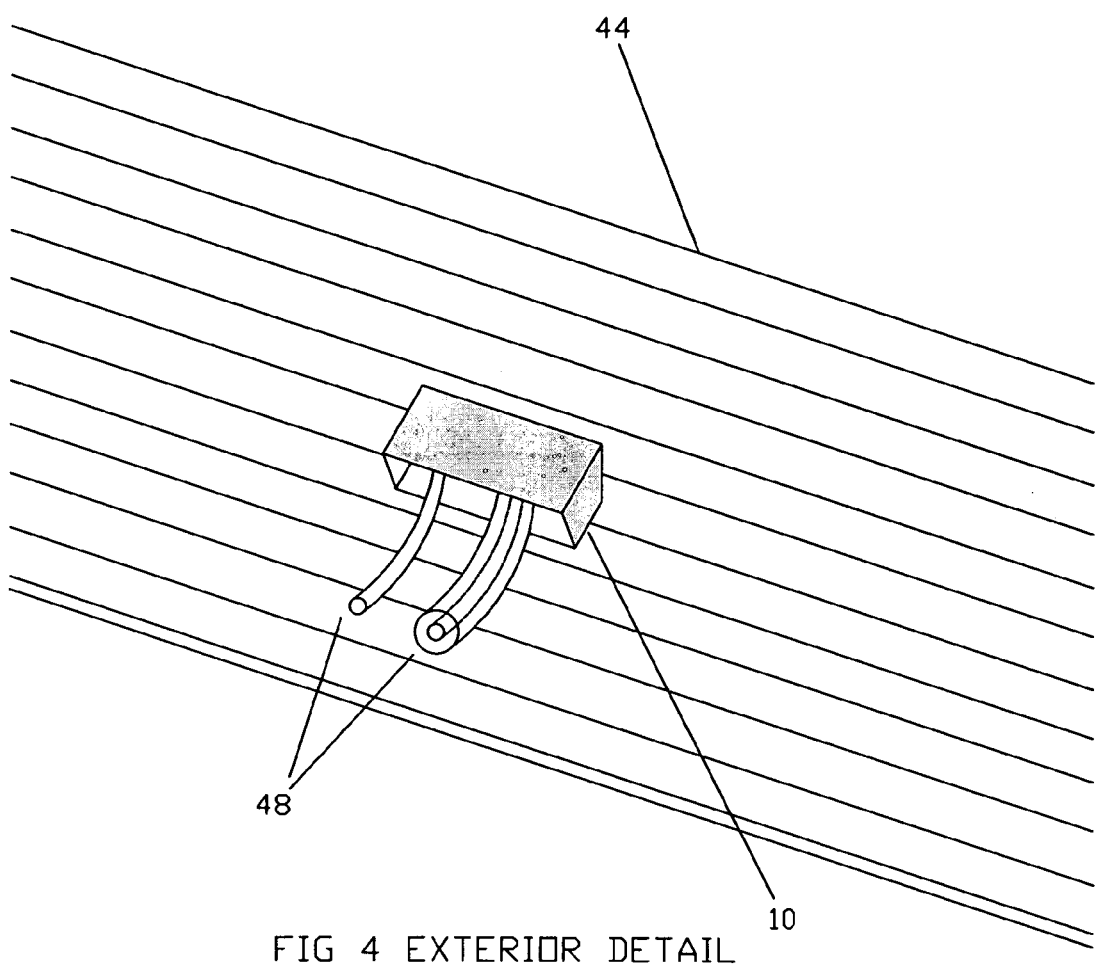
FIG 4 EXTERIOR DETAIL

SHIELD FOR WALL PENETRATION OF FLEXIBLE TUBING

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to a combination sleeve and bracket used to install and protect flexible tubing during and after building construction.

2. Background of the Invention

Flexible tubing is often installed in the new construction or renovation of residential or commercial buildings. An example is a refrigerant line-set, which is typically installed to interconnect split system air conditioning equipment. Flexible tubing may also be used in plumbing or fire sprinkler systems. The refrigerant line-set is probably the most prevalent usage of the invention. A line-set generally consists of two lines of copper tubing. The smaller of the two, the liquid line, is usually not insulated. The larger suction line is typically insulated. The purpose of the line-set is to tie together an outdoor air conditioner or heat pump to an indoor coil or air handler. Liquid and vapor refrigerant is pumped through the line set. The line-set is often routed through an attic or floor/ceiling assembly and then turned down into an outside wood or metal stud wall. Within generally 12" to 24" of the floor, the line-set turns and penetrates the outside wall siding.

The line-set is usually installed during the "rough" framing portion of the project. At this time there is usually some form of insulation board, particle board, plywood, etc. that is installed on the outside of the "studs", or vertical framing members. However, very often the final building siding is not installed at this point. Examples may include lap siding, sheet siding, brick, stucco, stone, etc. These are installed over the insulation board etc. at a later date in the construction process.

The usual installation of the line-set involves cutting a hole in the interior sheathing and installing the tubing through the hole at an approximate 20 to 75 degree angle. The tubing typically cannot be bent a full 90 degrees because it will "kink". A kink is a compression of the inside area of the tubing when it is bent to too sharp of an angle. The same process occurs when a drinking straw is bent too sharply. With many types of tubing, including copper, a kink usually cannot be repaired. It must be replaced.

After the installation personnel have installed the tubing at the correct angle, the tubing terminates outside the wall anywhere from a few inches to a few feet from the wall. The tubing is left at this point in the construction process without connecting it to an air conditioner or heat pump. The equipment is usually set later in the "trim" stage of the project after the exterior siding is installed. Quite often, later in the construction project, personnel from another subcontracting trade on the project will manually move the protruding tubing on the outside of the building. A major example is the exterior siding subcontractor. Brick masons will often move the tubing to a position where it protrudes from the wall at a 90-degree angle. This makes the bricks easier to install. A problem is created at that point because the tubing is generally kinked inside the wall. This problem may not be discovered until the project is almost complete. Since the tubing is kinked, the air conditioning system will not operate correctly. At this point in the project, the exterior sheathing has already been installed as well as the dry wall on the inside. The interior paint and carpet, as well as exterior paint are usually complete at this time. The only way to repair the kink is to cut either the dry wall on the inside or the exterior siding. This potentially causes other problems. To repair the kink, the kinked portion of the tubing must be cut out and a new 90-degree elbow, coupling, new tubing etc. are installed. These are soldered using high temperature torches. Since there is typically flammable material in close proximity such as wood framing, insulation, and exterior sheathing, this presents a significant fire hazard.

There is quite an expense involved when repairing this problem. This may involve repairs to drywall, siding, brick, interior paint, exterior paint, carpet cleaning and of course the tubing itself There is also quite an expense to repair the problem because in order to open the copper tubing, any refrigerant must be recovered in accordance with the Environmental Protection Agency guidelines. The tubing is usually leak tested. Then the system must be recharged with refrigerant.

Although other personnel on the construction project usually cause the above problems, sometimes the personnel that install the tubing cause the problem. This can happen without the knowledge of the installer because the suction line tubing is generally insulated with pipe insulation. This shields potential kinks from view. Because the tubing is installed through a rough-cut hole in the outside wall, there is nothing to regulate the angle of the bend in the tubing. If this problem occurs, it has the same results as when other personnel on the project cause the problem.

Quite often the line set is installed through a hole in the outside sheathing with nothing covering the hole from view. This can be visually unappealing. One common practice is to install a hooded piece of sheet metal or plastic over the tubing on the outside of the exterior sheathing. This hood resembles wall caps commonly used for air exhaust applications such as exhaust fans or clothes dryer vents. These covers are installed after the exterior sheathing and have no effect of protecting the copper from being kinked. They are mainly installed for their appearance or possibly to prevent water leaks.

Another common problem with the exterior wall penetration of tubing is that rainwater can enter through the hole. The hole in the sheathing is usually caulked or spray foam is applied around the tubing. The pipe insulation around the tubing makes it difficult to have a solid surface to apply the caulking or foam. In addition, the caulk foam, or insulation may degrade over time and cause water infiltration at a later date.

BACKGROUND OF INVENTION—OBJECTS AND ADVANTAGES

Several objects and advantages of the invention are:
(a) to provide a device to protect flexible tubing from kinks inside the wall due to manual adjustment of the tubing from outside the wall.

(b) to provide a device to make it easier to install tubing without kinking.
(c) to provide a device that improves the appearance of the tubing where it penetrates the exterior siding.
(d) to provide a device that reduces the potential for water infiltration around the tubing into the wall.
(e) to provide a device that reduces lost time on construction projects due to damage and repairs to flexible tubing.

Still further objects and advantages will become apparent from a consideration of the ensuing description and drawings.

BRIEF SUMMARY OF THE INVENTION

In accordance with the present invention the shield comprises a square, rectangular, or round sleeve with a nail or screw plate attachment attached at a fixed angle.

BRIEF DESCRIPTION OF THE SEVERAL VIEWS OF THE DRAWING

FIGS. 1, 2, and 3 show different embodiments. Each embodiment is shown in similar detail with different alphabetic suffixes.

FIGS. 1a through 1f show a shield with a flat side attachment device.

FIGS. 2a through 2f show a shield with one top and one mid body attachment device.

FIGS. 3a through 3f show a shield with an angled side attachment device.

FIG. 4 shows a shield installed in place from a view of an outside wall. This view is the same in all embodiments.

DRAWINGS—REFERENCE NUMERALS

10 Sleeve
12 Attachment plate
14 Attachment holes
16 Intersection of sleeve and attachment plate
18 Attachment hardware
22a Lower attachment Angle
22b Upper attachment Angle
26 Intersection of sleeve and attachment Angle
32 Attachment Angle
36 Intersection of sleeve and attachment Angle
40 Interior Sheathing
42 Exterior Sheathing
44 Wall Siding
46 Framing stud
48 Flexible tubing, wiring, or cabling
50 Sealant
φ Angle between sleeve and attachment plate or angle

DESCRIPTION OF THE INVENTION

FIGS. 1a Through 1f.—Preferred Embodiment

A preferred embodiment of the device is shown in FIGS. 1a through 1f. A sleeve 10 has a cross section that is rectangular, square, or round. A rectangular cross section is shown. It is open through the middle such that flexible tubing or cabling may be installed through. The sleeve is constructed of a durable material such as metal, PVC, or plastic. An attachment plate 12 is attached to a side of the sleeve 10 at an angle φ. Attachment plate is mechanically attached to sleeve by any structurally sound method depending on the material. Metal parts may be welded, screwed, bolted, riveted, etc. Plastic may be molded in one assembly, screwed, bolted, etc. This angle is equal to or less than the maximum angle at which the installed tubing 48 can be bent without kinking and is generally between 20 and 75 degrees. The intersection of the sleeve and attachment plate is point 16. This point is located at the edge of the sleeve such that there is a maximum amount of room for the tubing to bend when it transitions from the wall to the sleeve. The attachment plate 12 has attachment holes 14.

FIGS. 1e and 1f show the device installed in an exterior frame wall of a building. The attachment plate 12 is installed flush with a framing stud 46. Framing studs are typically constructed of solid wood lumber or metal. Attachment hardware 18 such as screws, bolts, nails, or rivets pass through attachment holes 14 to framing stud 46. Flexible tubing 48 is installed in the stud cavity enclosed by studs 46, interior sheathing 40 and exterior sheathing 42. The device with tubing passes through the exterior sheathing 42 and wall siding 44. Interior sheathing 40 typically consists of dry wall, plaster, or paneling. Exterior sheathing 42 typically consists of rigid sheet material such as insulation board, plywood, or particleboard. Wall siding 44 typically consists of lap siding, sheet siding, brick, stone, or stucco. A sealant 50 such as caulking, spray foam, etc. forms a weatherproof seal between the tubing 48 and the sleeve 10 as well as between the sleeve 10 and wall siding 44.

FIGS. 2a Through 2f.—Additional Embodiment

An additional embodiment is shown in FIGS. 2a through 2f. This embodiment is similar to that shown in FIGS. 1a through 1f except for the attachment means. Attachment Angles 22a and/or 22b are attached to the front and/or back side of the sleeve 10 at an angle φ. This angle generally is between 20 and 75 degrees. The intersection of the sleeve and attachment angle 22b is point 26. The attachment angles have attachment holes 14.

FIGS. 2e and 2f show the device installed in an exterior frame wall of a building. The attachment angles 22a and 22b are installed flush with exterior sheathing 42. Attachment hardware 18 such as screws, bolts, nails, or rivets pass through attachment holes 14 to exterior sheathing 42. Flexible tubing 48 is installed in the stud cavity enclosed by studs 46, interior sheathing 40 and exterior sheathing 42. The device with tubing passes through the exterior sheathing 42 and wall siding 44.

FIGS. 3a Through 3f.—Additional Embodiment

An additional embodiment is shown in FIGS. 3a through 3f. This embodiment is similar to that shown in FIGS. 1a through 1f except for the attachment means. Attachment Angle 32 is constructed of a durable material such as metal, PVC, or plastic that has a cross sectional shape of a right angle. Attachment angle 32 is attached to the side of the sleeve 10 at an angle φ. This angle generally is between 20 and 75 degrees. The intersection of the sleeve 10 and attachment angle 32 is point 36. The attachment angle 32 has attachment holes 14.

FIGS. 3e and 3f show the device installed in an exterior frame wall of a building. The attachment angle 32 is installed flush with exterior sheathing 42. Attachment hardware 18 such as screws, bolts, nails, or rivets pass through attachment holes 14 to exterior sheathing 42. Flexible tubing 48 is installed in the stud cavity enclosed by studs 46, interior sheathing 40 and exterior sheathing 42. The device with tubing passes through the exterior sheathing 42 and wall siding 44.

FIG. 4—Exterior Detail

FIG. 4 shows an exterior detail view of the device as installed in a building frame wall. Sleeve 10 protrudes through the siding 44. Flexible tubing 48 passes from the inside of the wall cavity through sleeve 10 and to the exterior.

OPERATION

FIGS. 1a–1f, 4 Primary Embodiment

The shield is installed in an outside frame wall of a building. If the exterior sheathing 42 has been installed, a hole is cut in the sheathing to match the size and shape of the sleeve 10. The hole is cut whereby the side of the hole is flush with the side of the stud 46. The shield is installed through the sheathing 42 at an angle such that the attachment plate 12 is parallel to the framing stud 46. At least one attachment hardware 18, i.e. a screw, nail, bolt, or rivet is installed through the attachment hole 14 in the top of the attachment plate and at least one more in the hole(s) in the bottom of the attachment plate 12. If the sheathing 42 has not been installed, the installation is similar except that it is not necessary to cut the hole.

Flexible tubing 48 is then installed running from inside the stud cavity surrounded by the studs 46, interior sheathing 40, and exterior sheathing 42. This step may be immediately after the shield installation or thereafter. In any case it is generally before the interior sheathing is installed. The tubing passes through the sleeve 10 and out of the exterior wall. There may be one or more lines of tubing installed in one shield. One or more of the lines of tubing may be insulated. Wiring may also be installed through the shield.

After the shield has been installed, wall siding 44 is installed over the exterior sheathing 42 and around the sleeve/tubing assembly. This may be before or after the tubing has been installed.

Finally the shield assembly is sealed as necessary. This may include caulking, spray foam etc. The sealant 50 is installed inside the sleeve 10 between the tubing and the sleeve as well as between the sleeve and the wall siding 44.

OPERATION

FIGS. 2a–2f, 4 Secondary Embodiment

The installation of this secondary embodiment is similar to that of the primary embodiment except for the attachment means. The shield is attached to the exterior sheathing 42. This embodiment therefore must be installed after the exterior sheathing. At least one attachment hardware 18, i.e. a screw, nail, bolt, or rivet is installed through the attachment hole 14 in the attachment angle 22b and at least one more in the hole(s) in attachment angle 22a.

OPERATION

FIGS. 3a–3f, 4 Secondary Embodiment

The installation of this secondary embodiment is similar to that of the primary embodiment except for the attachment means. The shield is attached to the exterior sheathing 42. This embodiment therefore must be installed after the exterior sheathing. At least one attachment hardware 18, i.e. a screw, nail, bolt, or rivet is installed through the attachment hole 14 in the top of the attachment angle 32 and at least one more in the hole(s) in the bottom of the attachment angle 32.

ADVANTAGES

A number of advantages of the shield become evident:
(a) The flexible tubing is protected from kinks inside the stud cavity after installation. The shield is sufficiently strong such that it cannot be moved by manual pressure. The tubing can only be bent to the established angle of the sleeve to the stud cavity. It is therefore virtually impossible to kink the tubing inside the wall due to manual pressure on the tubing or the sleeve from the outside. If enough pressure is exerted on the tubing from outside the wall, the tubing can only be kinked on the outside of the wall at the end of the sleeve. In this case the tubing can generally be repaired from the outside without damaging the building.
(b) The flexible tubing is protected from kinks during installation. The shield regulates the angle that the tubing must be bent in order to install the tubing through the wall. This reduces the possibility of kinking during installation of the tubing.
(c) The appearance of the tubing penetration of the outside wall is improved over the prior methods. Rather than having an irregular hole in the wall for one or more different sizes of tubing, the hole for the penetration is easily cut in the shape of the sleeve. In the case of having multiple applications on a project, all of the tubing penetrations are uniform in appearance.
(d) The chance of water penetration into the wall is significantly reduced. Since the sleeve is installed at a down facing angle, any water that comes in contact with the sleeve drains down the sleeve and away from the wall siding. Therefore, even if sealing is incorrectly installed or even not installed at all, the chances of water infiltration is greatly reduced. If sealing were not installed inside the sleeve between the sleeve and the tubing, water would have to travel up the sleeve in order to get into the building.
(e) The construction schedule of the building project is compressed. Time spent repairing problems is reduced as shown above.

CONCLUSION, RAMIFICATION, AND SCOPE

Accordingly, the reader will see that the shield provides a method to improve the overall quality of a tubing or cable installation through an exterior wall on a new or existing building. The chances of problems on the jobsite due to the kinking of flexible tubing or cabling are reduced dramatically. The occurrence of kinks inside the wall is virtually eliminated. This eliminates the necessity of repairs to the tubing or cabling, drywall, exterior siding, or wall insulation. The necessity of recharging air conditioning or refrigeration systems is also eliminated. It also eliminates the need to clean carpets due to the debris and dust generated during the repairs as well as any new paint on the interior or exterior walls. Because the necessity of soldering inside the wall is eliminated, so is the chance of a fire.

The installation of a shield with the tubing or cabling also provides a very professional, neat appearance as opposed to the usual rough-cut holes usually seen. The penetration in the building siding around the sleeve is a regular shape such as rectangular, square, or round. In the case of having several different sets of tubing or cabling on a project, the installation is consistent from one set to the next.

The shield significantly reduces the chance of water infiltration into the building. Most current methods of installing tubing or cabling in a wall completely depend on caulking or sealants to provide a weatherproof seal. The shield, due to its downward sloping penetration, naturally drains water away from the wall. The shield also provides a regular intersection with the building siding so that a sealant can be neatly and effectively installed.

The shield may also save time on the construction schedule due to the savings in the time spent conducting the repairs. This can be quite significant because to the involvement of many different subcontractors in repairing problems related to the kinking of the tubing or cabling. These possibly include the drywaller, insulation subcontractor, building siding subcontractor, painter, carpet layer, and of course the mechanical subcontractor.

Although the description above contains much specificity, these should not be construed as limiting the scope of the invention but as merely providing illustrations of some of the presently preferred embodiments of this invention. For example, the shield could comprise of the sleeve as shown without the attachment angles or plates. Holes for screws, nails, etc. could be located in the sleeve itself In addition, the sleeve could have one or both ends cut at a different angle than the 90-degree angle as shown.

Thus the scope of the invention should be determined by the appended claims and their legal equivalents, rather than the examples given.

What is claimed is:

1. A shield assembly for wall penetration of flexible tubing, comprising:
    an elongated sleeve comprised of a tube or channel having a first side, a second side, an upper side, a lower side, and a first open end opposed to a second open end whereby flexible tubing may be installed into the first open end, pass through the tube or channel, and exit the second open end;
    said elongated sleeve being of predetermined length sufficient to penetrate an exterior frame wall through any exterior sheathing and building siding;
    said elongated sleeve being of predetermined inside dimensions to accommodate one or more flexible tubes;
    an elongated attachment plate of sufficient strength to resist deformation due to manually applied pressure;
    said attachment plate having one or more attachment holes for installation of mounting hardware;
    said attachment plate being affixed to one of the first or second sides laterally adjacent to the first open end of the elongated sleeve and such that the one or more attachment holes are oriented to permit installation of attachment hardware into a building-framing stud;
    said attachment plate oriented such that it can be installed with its longitudinal dimension vertical and attached to the surface of the stud in the interior of the wall; and
    the geometric angle between the centerline of the longitudinal direction of the said attachment plate and the elongated dimension of the said elongated sleeve is such that, when the centerline of the longitudinal direction of the said attachment plate is vertical, the first open end faces at an upward angle whereby flexible tubing can be installed to transition from the vertical inside the wall cavity to the interior of the sleeve and the second open end faces at a downward angle outside of the wall.

2. The shield assembly of claim 1, wherein geometric angle between the attachment plate and the elongated tube is between twenty (20) degrees and seventy five (75) degrees.

3. The shield assembly of claim 1, wherein the elongated sleeve is comprised of durable material selected from the group comprising at least one of metal, polyvinyl chloride (PVC) or plastic.

4. A shield assembly for wall penetration of flexible tubing, comprising:
    an elongated sleeve comprised of a tube or channel having a first side, a second side, an upper side, a lower side, and a first open end opposed to a second open end whereby flexible tubing may be installed into the first open end, pass through said tube or channel, and exit out the second open end;
    said sleeve being of predetermined length sufficient to penetrate an exterior frame wall through any exterior sheathing and building siding;
    said sleeve being of predetermined inside dimensions to accommodate one or more flexible tubes;
    two elongated attachment angles of sufficient strength to resist deformation due to manually applied pressure;
    said attachment angles affixed one to the upper side of the elongated tube or channel along the edge of the first open end and the other across the vertical midsection of the lower side of the elongated tube or channel;
    said attachment angles having one or more attachment holes for installation of mounting hardware;
    said attachment angles oriented so that they can be installed with their longitudinal dimensions horizontal and attached to building sheathing in the interior of the wall; and
    the geometric angle between the attachment angles and the upper and lower sides of the said elongated sleeve is such that, when the attachment angles' protruding sides are vertical and their longitudinal axes are horizontal, the first open end faces at an upward angle whereby flexible tubing can be installed to transition from the vertical inside the wall cavity to the interior of the sleeve and the second open end faces at a downward angle outside of the wall.

5. The shield assembly of claim 4, wherein the attachment angles are affixed to the elongated sleeve at a geometric angle between twenty (20) and seventy five (75) degrees.

6. The shield assembly of claim 4, wherein the elongated sleeve is comprised of durable material selected from the group comprising at least one of metal, polyvinyl chloride (PVC) or plastic.

7. A shield assembly for wall penetration of flexible tubing, comprising:
    an elongated sleeve comprised of a tube or channel having a first side, a second side, an upper side, a lower side, and a first open end opposed to a second open end whereby flexible tubing may be installed into the first open end, pass through said tube or channel, and exit out the second open end;
    said sleeve being of predetermined length sufficient to penetrate an exterior frame wall through any exterior sheathing and building siding;
    said sleeve being of predetermined inside dimensions to accommodate one or more flexible tubes;
    an elongated attachment angle of sufficient strength to resist deformation due to manually applied pressure;
    said attachment angle having one or more attachment holes for installation of mounting hardware;
    said attachment angle being affixed to one of the first or second sides laterally adjacent to the first open end of the elongated sleeve and such that the one or more attachment holes are oriented to permit installation of attachment hardware into building exterior sheathing;

said attachment angle oriented such that it can be installed with its longitudinal dimension vertical and attached to building sheathing in the interior of the wall; and the geometric angle between the centerline of the longitudinal direction of the said attachment angle and the elongated dimension of the said elongated sleeve is such that, when the centerline of the longitudinal direction of the said attachment angle is vertical, the first open end faces at an upward angle whereby flexible tubing can be installed to transition from the vertical inside the wall cavity to the interior of the sleeve and the second open end faces at a downward angle outside of the wall.

8. The shield assembly of claim 7, wherein the geometric angle between the attachment angle and the elongated tube is between twenty (20) and seventy five (75) degrees.

9. The shield assembly of claim 7, wherein the elongated sleeve is comprised of durable material selected from the group comprising at least one of metal, polyvinyl chloride (PVC) or plastic.

* * * * *